Nov. 22, 1932.  W. P. KELLETT  1,888,767
TRUCK
Filed July 7, 1930    2 Sheets-Sheet 2

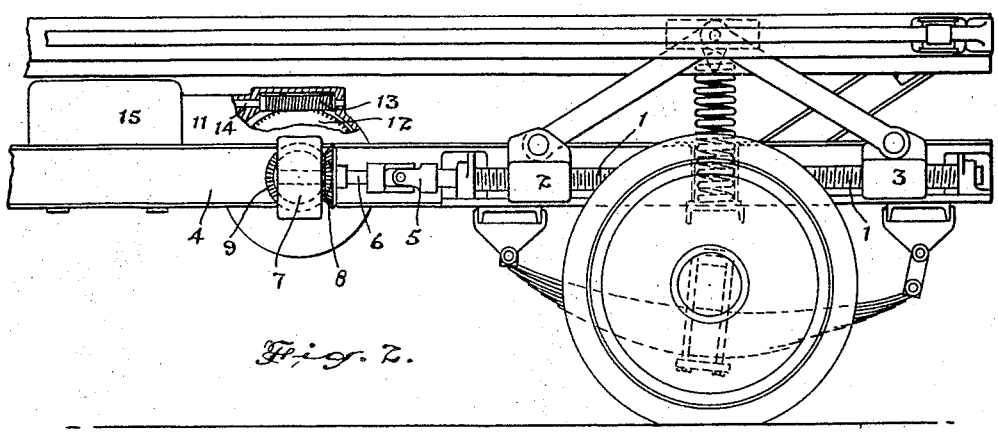
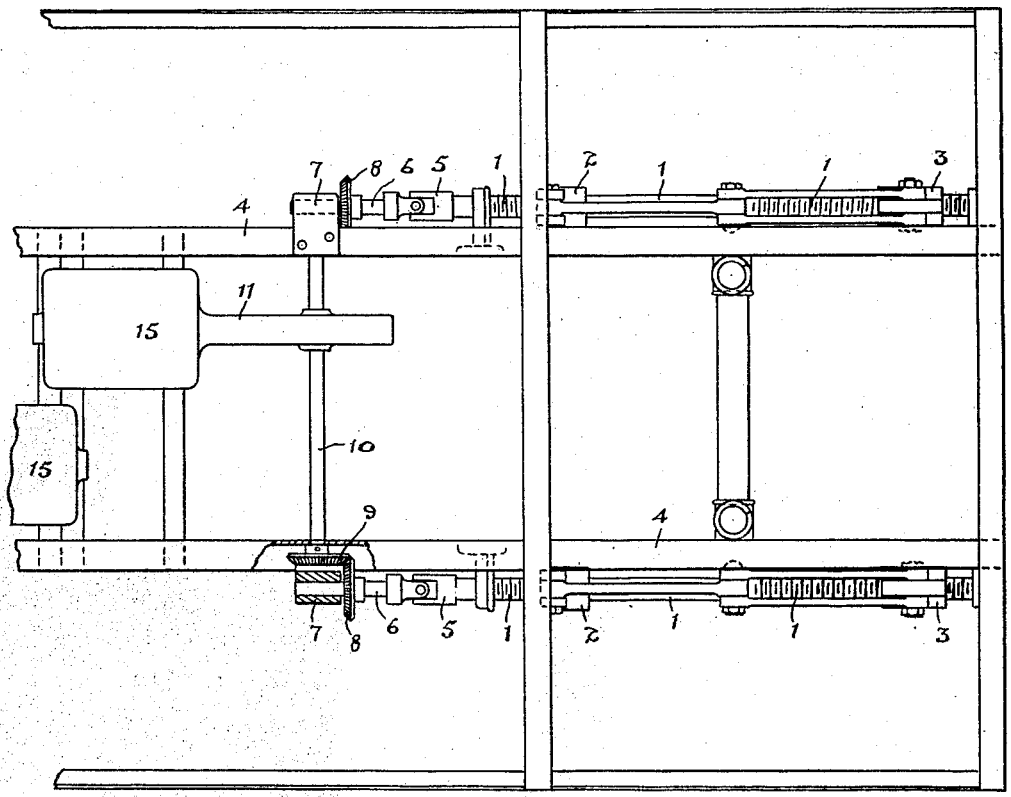

Inventor.
William Platts Kellett.

Patented Nov. 22, 1932

1,888,767

UNITED STATES PATENT OFFICE

WILLIAM PLATTS KELLETT, OF NEW YORK, N. Y.

TRUCK

Application filed July 7, 1930. Serial No. 466,143.

The principal objects of this invention are, to improve the means for elevating the movable platform of a truck which is adapted to be raised or lowered to different elevations, and to provide an arrangement of lifting mechanism which will enable the operation of the platform mechanism without the necessity of having the tractor portion of the truck in alignment with the platform section, thereby greatly enhancing the use of the truck in cramped positions.

A further object is to eliminate numerous causes of mechanical troubles in devices of this kind caused by the rack and twist of the frame structure in use.

The principal feature of the invention consists in the novel arrangement of individual power units coupled with the elevating mechanism at each end of an elevating truck, such as is disclosed in my co-pending application, Serial Number 337,414 filed February 4th, 1929 for freight handling trucks which has eventuated into Patent No. 1,838,842, dated Dec. 29, 1931, and further in the provision of means for supplying power to such elevating means.

In the accompanying drawings, Figure 1 is a plan view of the mechanism arranged at one end of a truck constructed in accordance with this invention.

Figure 2 is a side elevational view of the mechanism shown in Figure 1.

Figure 3:
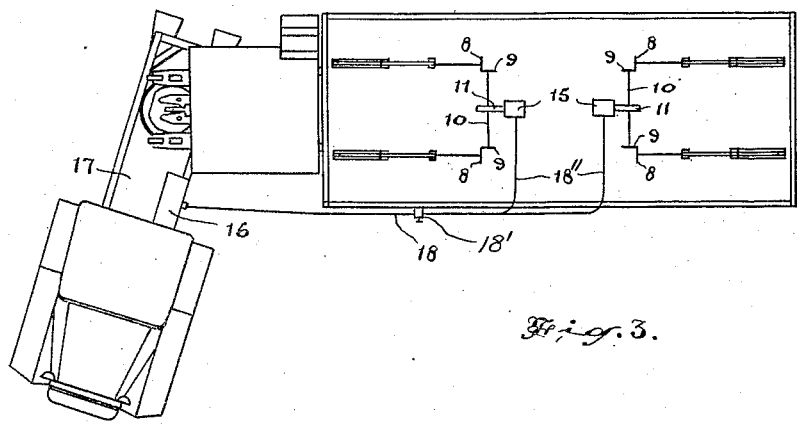
Figure 3 is a plan view on a reduced scale showing diagrammatically a possible arrangement of the tractor and trailer portion of the device.

In my previous application I have disclosed a structure in which a platform is mounted upon elevating mechanisms supported at each end of the body or fixed frame of a truck or trailer, and the operating toggle members are manipulated by threaded shafts mounted in journal bearings on the sides of the truck frame.

These shafts are operated by shafts connected by suitable gearing with transverse shafts which in turn are operated through a change gear mechanism driven from a longitudinal shaft which is connected with the engine of the tractor or truck mechanism.

The present invention contemplates the elimination of the centralized change gear mechanism operated from the longitudinal shaft driven from the tractor motor.

In the present invention the threaded shafts 1 journalled in the bearings 2 and 3 at each side and end of the truck frame 4 have connected thereto preferably through flexible couplings 5 the short shafts 6 which are journalled in bearing brackets 7.

Each of the shafts 6 has mounted on the free end a bevelled pinion 8 which meshes with a pinion 9 mounted one on each end of the cross shaft 10 journalled in the frame 4.

Upon the cross shaft 10 and preferably arranged within an enclosing casing 11 is a worm wheel 12 and the worm wheel is engaged by the worm 13 mounted on the shaft 14 of the electric motor 15 which is suitably supported on the frame of the truck. This motor is of course of the reversible type.

This arrangement of mechanism is duplicated for each end of the truck and by a suitable arrangement of switches 18' and wiring 18", the motors can be controlled at will, either to act in unison or to act separately for the purpose of raising the platform equally at both ends, or at either end, as may be desired.

With this construction of control mechanism the necessary power for operating the motors may be obtained from a suitable electric generator unit 16 mounted on the tractor member 17 to which the trailer structure is coupled in the usual pivotal manner.

Figure 5:
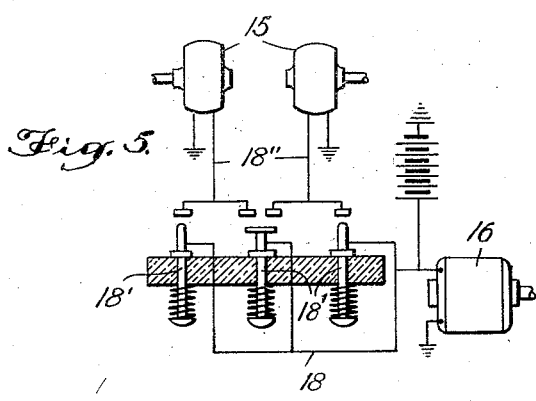
Figure 5 is a diagrammatic view illustrating in greater detail a suitable switching means for the selected control of the motor for operating and accurately positioning the movable platform.

On reference to the showing of Figure 5, it will be observed that if it is desired to operate the left-hand motor 15, this may be accomplished by pressing in on left-hand switch contact 18'. Similarly if only the right-hand motor 15 is required in operation this may be achieved by pressing in on right-hand switch contact 18″.

When the operation in unison of both motors 15 is required this may be effected by pressing in on the centre switch contact 18‴, which it will be seen, directs current to both motors simultaneously.

The accurate positioning of the movable platform may thus be effected with ease and rapidity and the manipulation of conveyances of this kind in accordance with varied loading and unloading conditions encountered is greatly facilitated.

With this arrangement it will be seen that the trailer can be backed into place with the tractor disposed in a right angular position in relation thereto and the power will be carried from the generator unit to the switches and individual motor controls through a suitable flexible cable 18.

A structure such as described eliminates many mechanical difficulties and materially reduces the troubles incident to the twisting and racking of the car frame in its travel over the roads.

The operation of the motors 15 through the worm and worm wheel drive operates the short shafts flexibly connected with the right and left hand threaded shafts which operate the toggles for lifting the platform. This may be installed at each end of the truck as closely coupled as possible, or in some cases it may be found desirable to use a central motor and to operate either or both of the elevating mechanisms therefrom.

The arrangement of shafts and coupling members necessary to accomplish the result would be within the purview of the ordinary mechanic and need not be shown.

Figure 4:
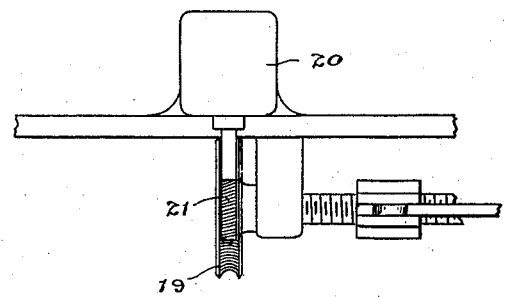
Figure 4 is a plan detail showing a modified arrangement of means for operating the toggle device for lifting the platform.

It may be found desirable to eliminate the cross shafts 10 and operate the threaded shafts by direct motor drive, as illustrated in Figure 4 in which worm wheels 19 are mounted directly upon the ends of the threaded toggle shafts and individual electric motors 20 mounted on the frame are provided with worms 21 meshing with the wheels 19. The control of the pairs of motors will be quite simple and may be carried out in the manner illustrated in Figure 5 by connecting a pair of motors to each of the wires 18 in place of the single motors there shown to control them to operate them in pairs or all in unison.

It will be readily understood that with the use of reversible electric motors the operation of the platform may be conducted with the greatest ease, it being merely necessary to operate the control switch to put either or both motors into operation with forward or reverse movement in accordance with the movement of the platform required. This eliminates all the complicated mechanism and control devices of a control gear box.

What I claim as my invention is:—

1. In a truck having a rigid frame, a pair of parallelly arranged right and left hand threaded shafts journalled in said frame at each end thereof, toggle members operatively mounted on each of said shafts, a platform carried by said toggle members, cross shafts journalled transversely of said frame and each operatively connected at its ends with one of said threaded shafts, a worm wheel secured to each of said cross shafts, electric motors having a worm shaft operatively engaging said worm wheels, means for supplying power to said motors, and means for controlling the operation thereof.

2. In a truck, the combination of a rigid frame having a movable frame superposed thereabove and means at the respective ends of the frame to be operated to selectively raise and lower the ends of the superposed frame relative to the rigid frame, said means rigidly securing said superposed frame against longitudinal thrusts in any position to which the frame is moved, power units operatively connected one to each of said respective raising and lowering means, a source of power, and control means directing power from said source to said power units collectively or individually to control respectively the elevation and angular disposition of said superposed frame relative to the rigid truck frame.

3. In a truck, the combination of a rigid frame having a movable frame superposed thereabove and means at the respective ends of the frame to be operated to selectively raise and lower the ends of the superposed frame relative to the rigid frame, said means rigidly securing said superposed frame against longitudinal thrusts in any position to which the frame is moved, electric power units connected one to each of said raising and lowering means, a source of electric energy, and switch means operable to direct current from said source to said electric power units collectively or individually to control respectively the elevation and angular disposition of said superposed frame relative to the rigid truck frame.

4. In a truck, the combination of a rigid frame having a movable frame superposed thereabove, toggle members mounted at each end of the frame to be operated to selectively raise and lower the ends of the superposed frame, said toggle means being disposed longitudinally of the truck frame and rigidly bracing the superposed frame against longitudinal thrusts in any position to which the latter is moved, threaded shafts mounted at the respective ends of the rigid frame for actuating said toggle means, electric motors connected with the respective shafts to operate same, and means for directing current to said motors collectively or individually to operate the toggle means at each end of the truck to respectively control the elevation and angular disposition of said superposed frame relative to the rigid truck frame.

5. In a truck, the combination of a rigid frame having a movable frame superposed thereabove, toggle members mounted at each end of the frame to be operated to selectively raise and lower the ends of the superposed frame, said toggle means being disposed longitudinally of the truck frame and rigidly bracing the superposed frame against longitudinal thrusts in any position to which the latter is moved, a pair of threaded shafts mounted at each end of the rigid truck frame and each operating one of said toggle means, an electric power unit operatively coupled with each pair of threaded shafts, and switch means operable to direct current to said electric power units collectively or individually to control respectively the elevation and angular disposition of said superposed frame relative to the rigid truck frame.

6. An improved transport vehicle for facilitating the handling of freight and the like, comprising in combination, a tractor having a trailer pivotally connected thereto, said trailer having a movable platform superposed thereabove, separate means at each end of said trailer to be operated to raise and lower said platform, said means acting to rigidly brace said platform against longitudinal thrusts in any of its adjusted positions, electric motors operatively connected respectively one with each of said separate raising and lowering means, an electric generator carried by said tractor, flexible cables connected with said generator and extending between said tractor and trailer, and a controlling switch mounted on said trailer and connected with said cables and operable to direct current therefrom to said respective motors collectively or individually to control respectively the elevation and angular relation of said superposed platform relative to the main frame of the trailer.

WILLIAM PLATTS KELLETT.